United States Patent [19]

Takagi et al.

[11] Patent Number: 5,088,650
[45] Date of Patent: Feb. 18, 1992

[54] FUEL INJECTOR WITH STRAINER

[75] Inventors: Takaaki Takagi; Toshiro Makimura, both of Obu; Kenji Kurita, Nagoya, all of Japan

[73] Assignees: Aisan Kogyo Kabushiki Kaisha, Obu; Toyota Jidosha Kabushiki Kaisha, Toyota, both of Japan

[21] Appl. No.: 494,539

[22] Filed: Mar. 16, 1990

[30] Foreign Application Priority Data

Mar. 18, 1989 [JP] Japan .................. 1-30966[U]

[51] Int. Cl.[5] ............................................. B01D 35/02
[52] U.S. Cl. ..................................... 239/575; 239/584; 239/585; 239/DIG. 23
[58] Field of Search .......... 239/575, 584, 585, DIG. 4, 239/DIG. 23; 210/500.1

[56] References Cited

U.S. PATENT DOCUMENTS

| | | |
|---|---|---|
| 4,608,166 | 8/1986 | Cain . |
| 4,678,124 | 7/1987 | Hafner et al. ............... 239/585 |
| 4,717,079 | 1/1988 | de Concini ................. 239/585 |
| 4,732,327 | 3/1988 | Aichele et al. ............. 239/585 X |
| 4,798,329 | 1/1989 | Mesenich .................... 239/585 X |
| 4,826,082 | 5/1989 | Greiner et al. ............. 239/585 X |

FOREIGN PATENT DOCUMENTS

| | | |
|---|---|---|
| 60-110674 | 7/1985 | Japan . |
| 63-168 | 1/1988 | Japan . |
| 63-45071 | 3/1988 | Japan . |
| 63-45072 | 3/1988 | Japan . |
| 63-92073 | 6/1988 | Japan . |
| 63-162968 | 10/1988 | Japan . |
| 63-182276 | 11/1988 | Japan . |
| 183167 | 6/1989 | Japan . |

Primary Examiner—Andres Kashnikow
Assistant Examiner—William Grant
Attorney, Agent, or Firm—Dennison, Meserole, Pollack & Scheiner

[57] ABSTRACT

A fuel injector including an injector casing having a fuel inlet at a side portion thereof; a valve housing having a fuel injection hole at a front end thereof and having a guide hole at an axial central portion thereof, the guide hole being communicated with the fuel inlet; a valve reciprocably accommodated in the guide hole, the valve being adjusted to close the fuel injection hole when advancing and open the fuel injection hole when retracting; a valve driving device for driving the valve to advance and retract the valve; and a fuel strainer mounted on an outer circumference of the injector casing, the strainer comprising a synthetic resin frame having annular portions at front and rear ends thereof and a metal ring connected to at least one of the front and rear end portions of the frame by insert molding of synthetic resin, the metal ring being press-fitted with the injector casing. With this construction, the generation of a gap due to the creep of resin between the injector casing and the strainer can be prevented to thereby prevent entry of a foreign matter into the injector.

3 Claims, 8 Drawing Sheets

FUEL INJECTOR WITH STRAINER

BACKGROUND OF THE INVENTION

The present invention relates to a fuel injector for injecting fuel into an engine, and more particularly to a so-called side-feed type fuel injector in which the fuel from a fuel tank is supplied into the injector through a fuel inlet formed through a side portion of an injector casing of the injector.

FIG. 5A is a vertical sectional view of such a side-feed type fuel injector in the prior art. Referring to FIG. 5A, a fuel injector 101 of a side-feed type is engaged through O-rings 104 and 105 to a mounting hole 102a of a jacket 102. The jacket 102 has a fuel passage 102b which is connected through a delivery pipe (not shown) and a fuel pump (not shown) to a fuel tank (not shown). The injector 101 has a fuel inlet 124 at its side portion, and the fuel from the fuel passage 102b is supplied through the fuel inlet 124 into the injector 101.

FIG. 5B shows an enlarged sectional view of a part of the side-feed type fuel injector 101 mounting a cylindrical strainer 123. Referring to FIG. 5B, an injector casing 111 is formed at its side portion with the fuel inlet 124. The cylindrical strainer 123 is fixedly mounted on an outer circumference of the injector casing 111 in such a manner as to cover the fuel inlet 124. The jacket 102 is so mounted as to surround the injector 101, and is adapted to be mounted to an engine (not shown). The jacket 102 is formed with a fuel passage 102b for feeding a pressurized fuel through the strainer 123 to the fuel inlet 124. The fuel is then fed into a valve housing 113 through a fuel groove 125 formed at a rear end of the valve housing 113. Thereafter, the fuel is injected from a fuel injection hole 113b shown in FIG. 5A by a valve 115 adapted to be driven by a driving means and thereby reciprocated in a guide hole 113a defined in the valve housing 113. The driving means is comprised of an armature 116 fixed to a rear end of the valve 115, a solenoid core 114 mounted in the injector casing 111, a solenoid coil 118 wound around the solenoid core 114, and a return spring 121 for normally biasing the valve 115 in a valve closing direction.

The strainer 123 is comprised of a synthetic resin frame 132 and a fine-mesh screen 131 attached to a side portion of the frame 132. The frame 132 is formed at its front and rear ends with annular portions 132a and 132b. The annular portions 132a and 132b are press-fitted with the outer circumference of the injector casing 111. However, since the synthetic resin frame 132 tends to generate creep as time proceeds, and particularly there is a possibility that a gap will be defined between the rear annular portion 132b and the outer circumference of the injector casing 111 because of the resin creep. As a result, there occurs a problem that the fuel will directly enter the injector 101 from the gap as well as through the fine-mesh screen 131, thus allowing a foreign matter contained in the fuel to enter the injector 101. A similar construction is disclosed in Japanese Utility Model Laid-open Publication No. 60-110674, for example.

To cope with the above-mentioned problem, there has been proposed a construction as shown in FIG. 6. Referring to FIG. 6, the injector casing 111 is formed at its outer circumference with an annular projection 111a, so that the rear annular portion 132b of the synthetic resin frame 132 may be urged against a front end surface of the annular projection 111a by a frictional force due to the interference fit between the front annular portion 132a and the outer circumference of the injector casing 111. However, when the front annular portion 132a of the frame 132 generates the resin creep, the strainer 123 will be slipped to cause the generation of a gap between the rear annular portion 132b and the front end surface of the annular projection 111a.

To improve the construction shown in FIG. 6, there has been proposed a further construction as shown in FIG. 7. Referring to FIG. 7, the annular projection 111a of the injector casing 111 is formed with a shoulder 111b, so that the rear annular portion 132b of the synthetic resin frame 132 is press-fitted with the shoulder 111b, and simultaneously the rear end surface of the rear annular portion 132b is urged against the front end surface of the annular projection 111a. However, when the front annular portion 132a of the frame 132 generates the resin creep, and the rear annular portion 132b of the frame 132 also generates the resin creep, the strainer 123 will be yet slipped to cause a gap between the rear annular portion 132b and the front end surface of the annular projection 111a.

SUMMARY OF THE INVENTION

It is an object of the present invention to provide a side-feed type fuel injector with a strainer having a synthetic resin frame which prevents the generation of a gap due to the creep of resin between the injector casing and the strainer, thereby preventing a foreign matter from entering the injector through this gap.

According to the present invention, there is provided a fuel injector comprising an injector casing having a fuel inlet at a side portion thereof; a valve housing having a fuel injection hole at a front end thereof and having a guide hole at an axial central portion thereof, said guide hole being communicated with said fuel inlet; a valve reciprocatably accommodated in said guide hole, said valve being adapted to close said fuel injection hole when advancing and open said fuel injection hole when retracting; means for driving said valve to advance and retract said valve; and a fuel strainer mounted on an outer circumference of said injector casing, said strainer comprising a synthetic resin frame having annular portions at front and rear ends thereof and a metal ring connected to at least one of said front and rear end portions of said frame by insert molding of synthetic resin, said metal ring being press-fitted with said injector casing.

With this construction, the metal ring is connected to at least one of the front and rear ends of the synthetic resin frame by insert molding of resin, and the metal ring connected to the frame is press-fitted with the injector casing. Therefore, it is possible to prevent that a gap due to the creep of resin will be generated between the injector casing and the strainer. The metal ring is strongly fixed to the injector casing at at least one of the front and rear ends of the frame as mentioned above. Therefore, it is possible to prevent that the strainer as a whole will be slipped to generate a gap at the other end of the frame not connected to the metal ring and allow entry of a foreign matter in the fuel through the gap into the injector.

The invention will be more fully understood from the following detailed description and appended claims when taken with the drawings.

DETAILED DESCRIPTION OF THE PREFERRED EMBODIMENTS

Figure 1:
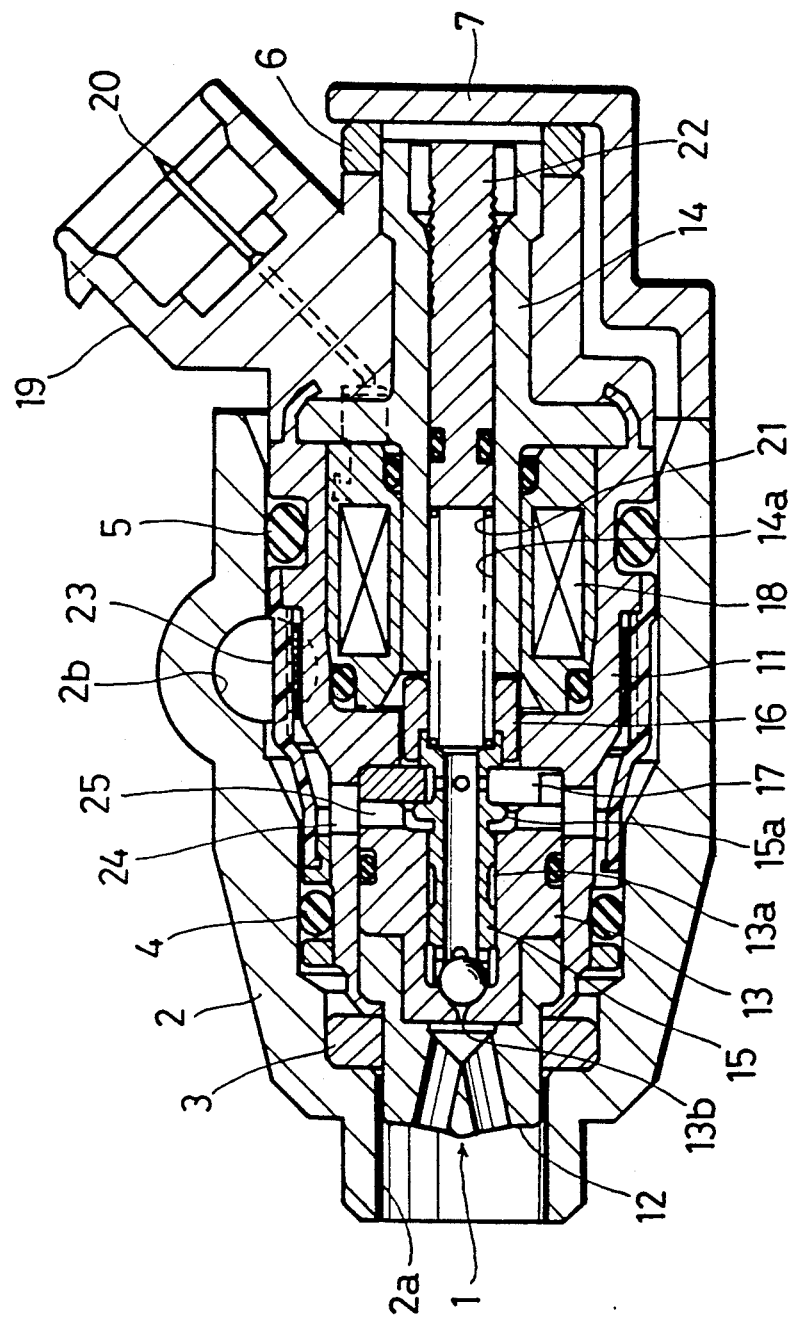
FIG. 1 is a vertical sectional view of a first preferred embodiment of the fuel injector according to the present invention.

Referring to FIG. 1, a fuel injector 1 of a side-feed type is inserted in a mounting hole 2a of a jacket 2. A front end portion of the injector 1 is engaged through an insulator 3 to the mounting hole 2a; a side portion of the injector 1 is engaged through O-rings 4 and 5 to the mounting hole 2a; and a rear end portion of the injector 1 is covered with a cap 7 through an insulator 6. Each jacket 2 mounting the injector 1 therein is connected together by an injector mounting member including a delivery pipe (not shown), and the injector mounting member is mounted to an intake manifold for each cylinder of an engine (not shown).

The injector 1 includes an injector casing 11 formed of a ferromagnetic material, a valve housing 13 mounted in a front portion of the injector casing 11, a nozzle 12 connected to a front end portion of the valve housing 13, and a solenoid core 14 mounted in a rear portion of the injector casing 11. The valve housing 13 is formed at its axial central portion with a guide hole 13a in which a valve 15 is reciprocatably inserted so as to open and close a fuel injection hole 13b formed at the front end of the valve housing 13. An armature 16 is mounted to a rear end portion of the valve 15 in such a manner that a rear end surface of the armature 16 is opposed to a front end surface of the solenoid core 14. A stopper 17 for limiting a rearward movement of the valve 15 is interposed between the injector casing 11 and the valve housing 13. The valve 15 is formed with a flange 15a adapted to abut against the stopper 17 when the valve 15 is opened to be rearwardly moved. A solenoid coil 18 is mounted on the outer circumference of the solenoid core 14, and is connected through a terminal 20 provided in a connector 19 to an external circuit (not shown). The solenoid core 14 is formed at its axial central portion with a through-hole 14a in which a spring 21 is inserted for normally biasing the valve 15 in a valve closing direction. An adjusting rod 22 is also inserted in the through-hole 14a on the rear side of the spring 21, so as to adjust a spring force of the spring 21. As will be hereinafter described in detail, a fuel strainer 23 is mounted on the outer circumference of the injector casing 11. Further, the injector casing 11 is formed at its side portion with a fuel inlet 24, and the valve housing 13 is formed at its rear end with a fuel groove 25 communicated with the fuel inlet 24.

Figure 2:
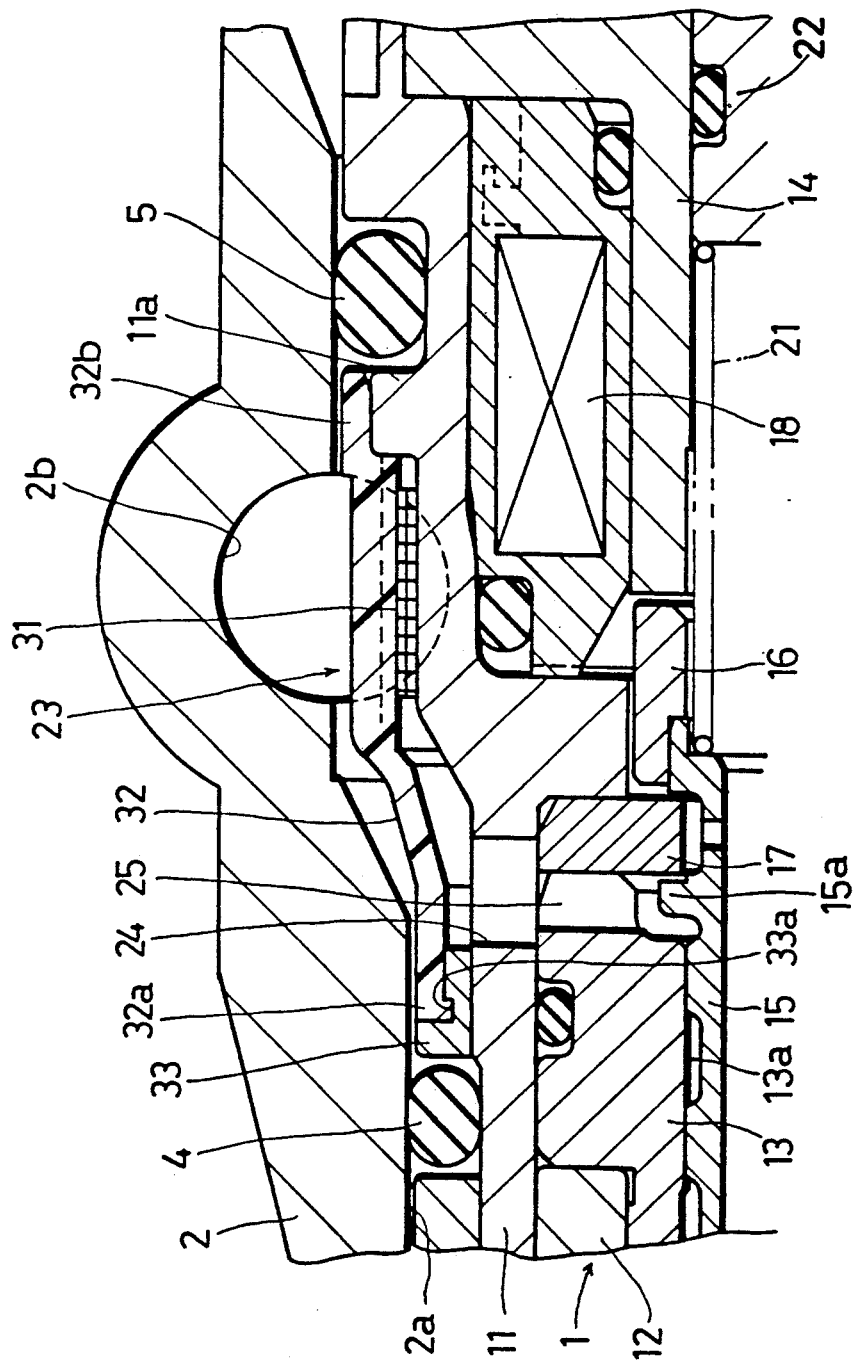
FIG. 2 is an enlarged sectional view of an essential part of the fuel injector shown in FIG. 1, a substantially upper half thereof being shown.

Referring to FIG. 2 which shows a substantially upper half of a fuel inlet portion of the injector 1 in the first preferred embodiment of the present invention, the strainer 23 having a cylindrical configuration is provided with a fine-mesh screen 31 and a synthetic resin frame 32 mounted to the screen 31. The frame 32 is formed at its front end with an annular portion 32a. A metal ring 33 is integrally connected to the front annular portion 32a by insert molding of synthetic resin. Because of insert molding, there can be obtained a sufficiently higher adhesive property between a synthetic resin surface of the front annular portion 32a and a metal surface of the metal ring 33 as compared with a connecting method by interference fit in the prior art. Particularly, as the metal ring 33 is formed at its outer circumference with an annular groove 33a, the resin is filled in the annular groove 33a at the time of insert molding, thereby ensuring the adhesive property between the frame 32 and the metal ring 33. The metal ring 33 connected to the frame 32 is press-fitted with the outer circumference of the injector casing 11. On the other hand, a rear annular portion 32b of the frame 32 is press-fitted with an annular projection 11a of the injector casing 11. Thus, the strainer 23 is fixed to the injector casing 11. Since the metal ring 33 does not generate the creep as appearing in the resin, there is no fear that the front annular portion 32a is loosened due to the creep. Accordingly, even when the rear annular portion 32b of the resin frame 32 generates the creep to cause a reduction in adhesive property, there is no fear that the strainer as a whole is loosened or slipped, thereby preventing the generation of a gap between the rear annular portion 32b and the annular projection 11a which gap will allow passing of a foreign matter therethrough. Therefore, it is possible to prevent the foreign matter from entering the injector 1 as in the prior art. Further, an outer end surface of the metal ring 33 may serve as a partition wall for retaining the O-ring 4.

Although the metal ring 33 is connected to the front end of the frame 32 in the above preferred embodiment, it may be connected to the rear end of the frame 32.

Figure 3:
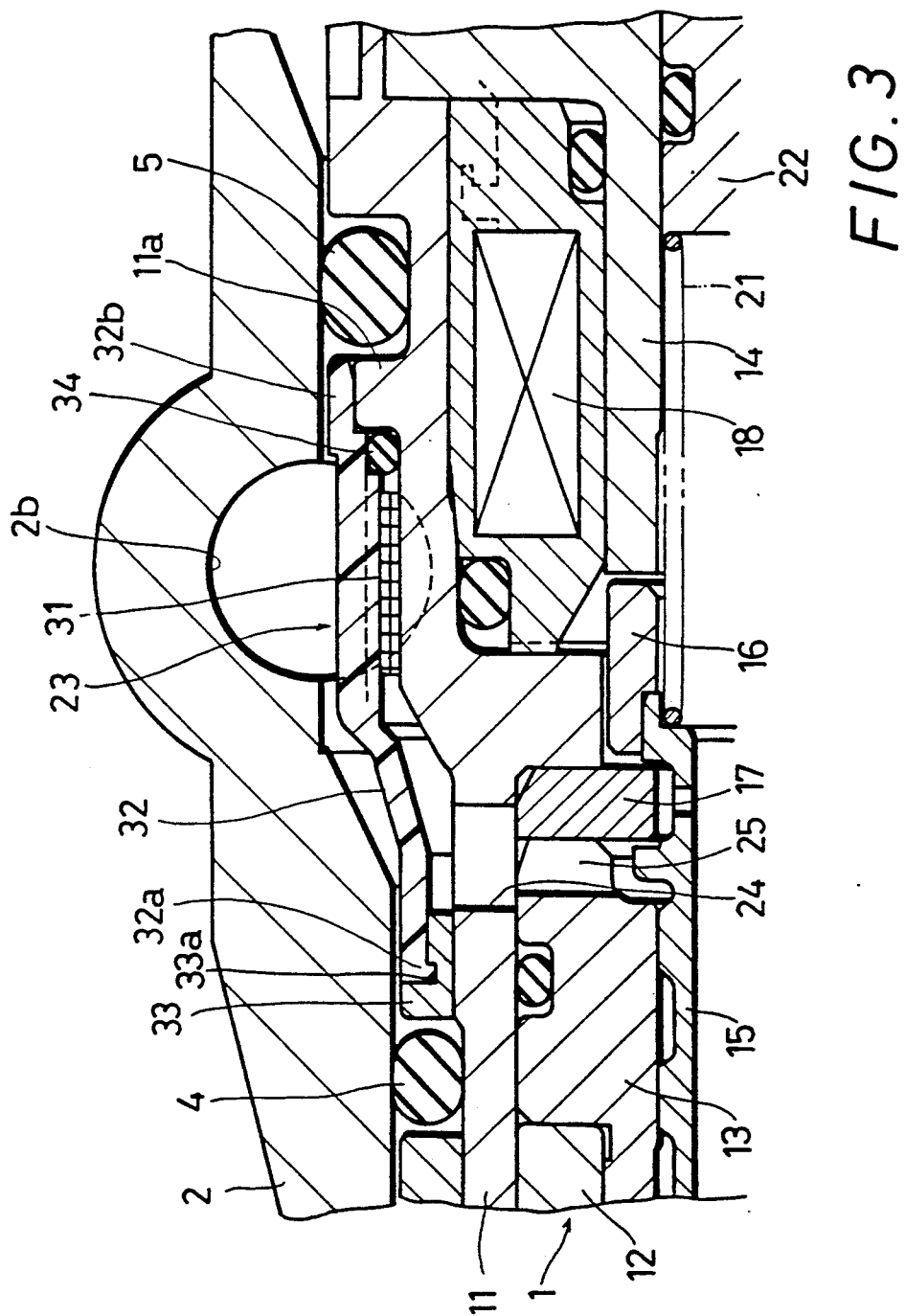
FIG. 3 is a view similar to FIG. 2, showing a second preferred embodiment of the present invention.

Referring to FIG. 3 which shows a second preferred embodiment of the present invention, an O-ring 34 is interposed between the injector casing 11 and the frame 32 at a position just inside of the annular projection 11a of the injector casing 11, so that the adhesive property of the rear annular portion 32b of the frame 32 may be more improved. The other construction is the same as that shown in FIG. 2.

Figure 4:
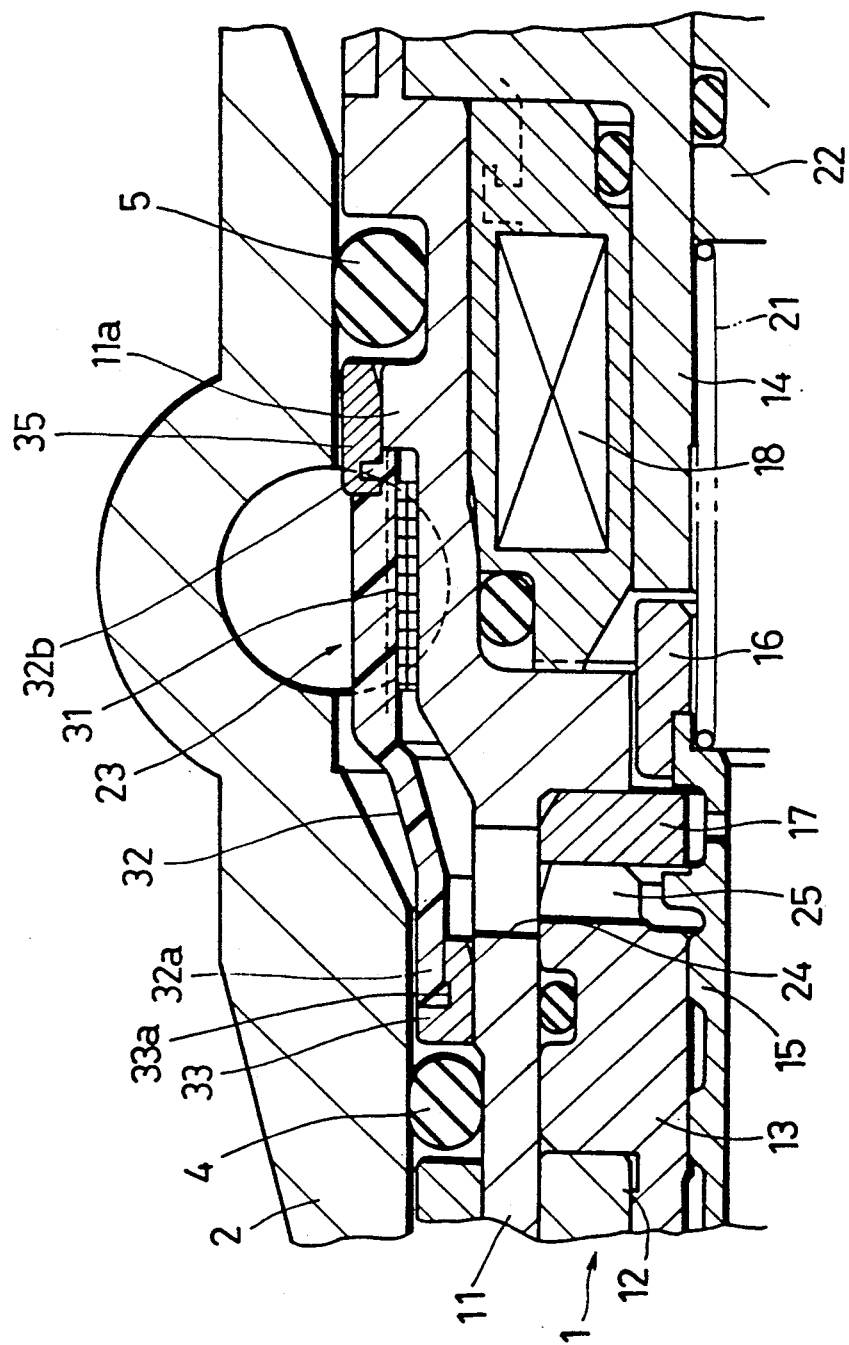
FIG. 4 is a view similar to FIG. 2, showing a third preferred embodiment of the present invention.
Figure 5A:
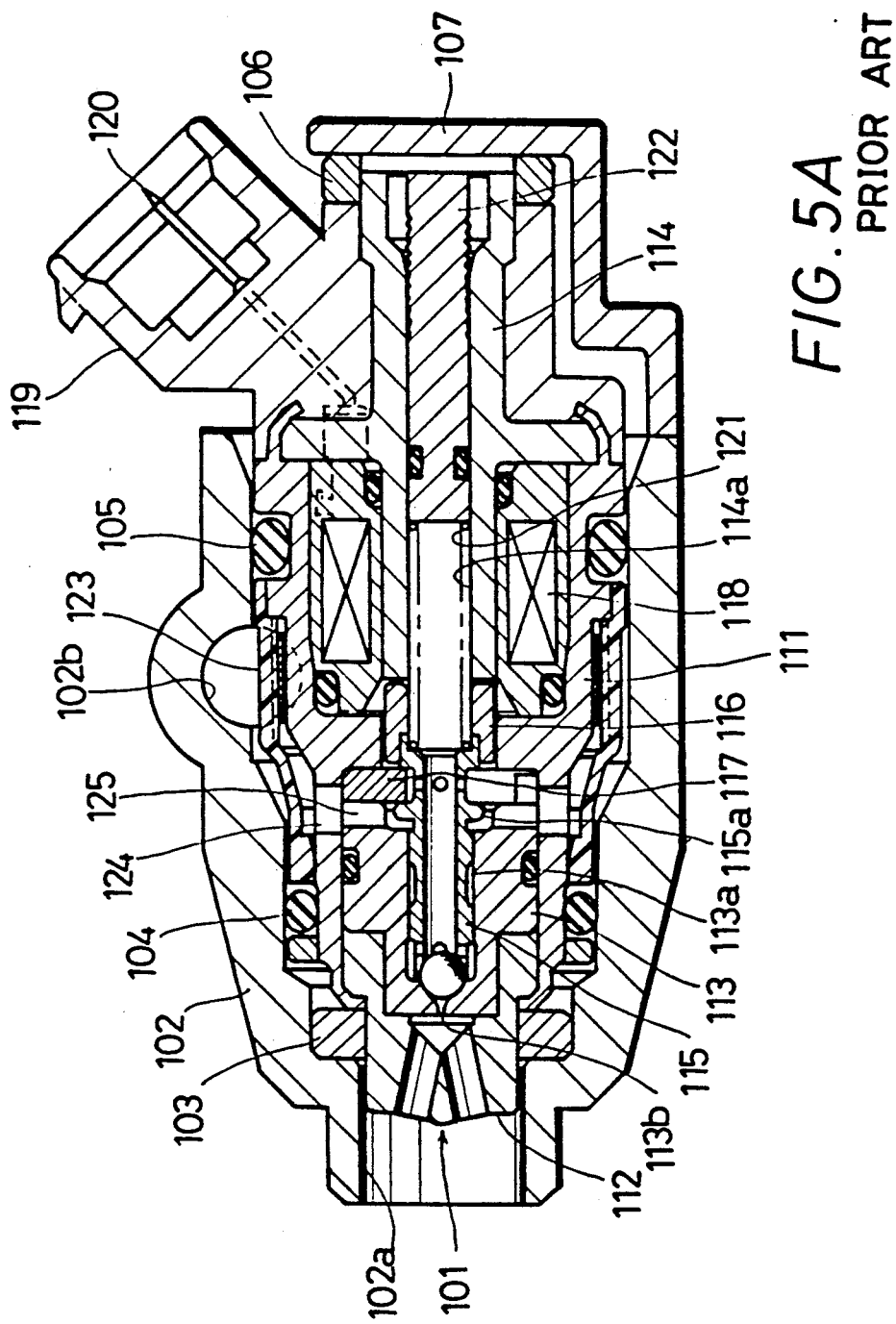
FIG. 5A is a vertical sectional view of the side-feed type fuel injector mounted to the jacket in the prior art.
Figure 5B:
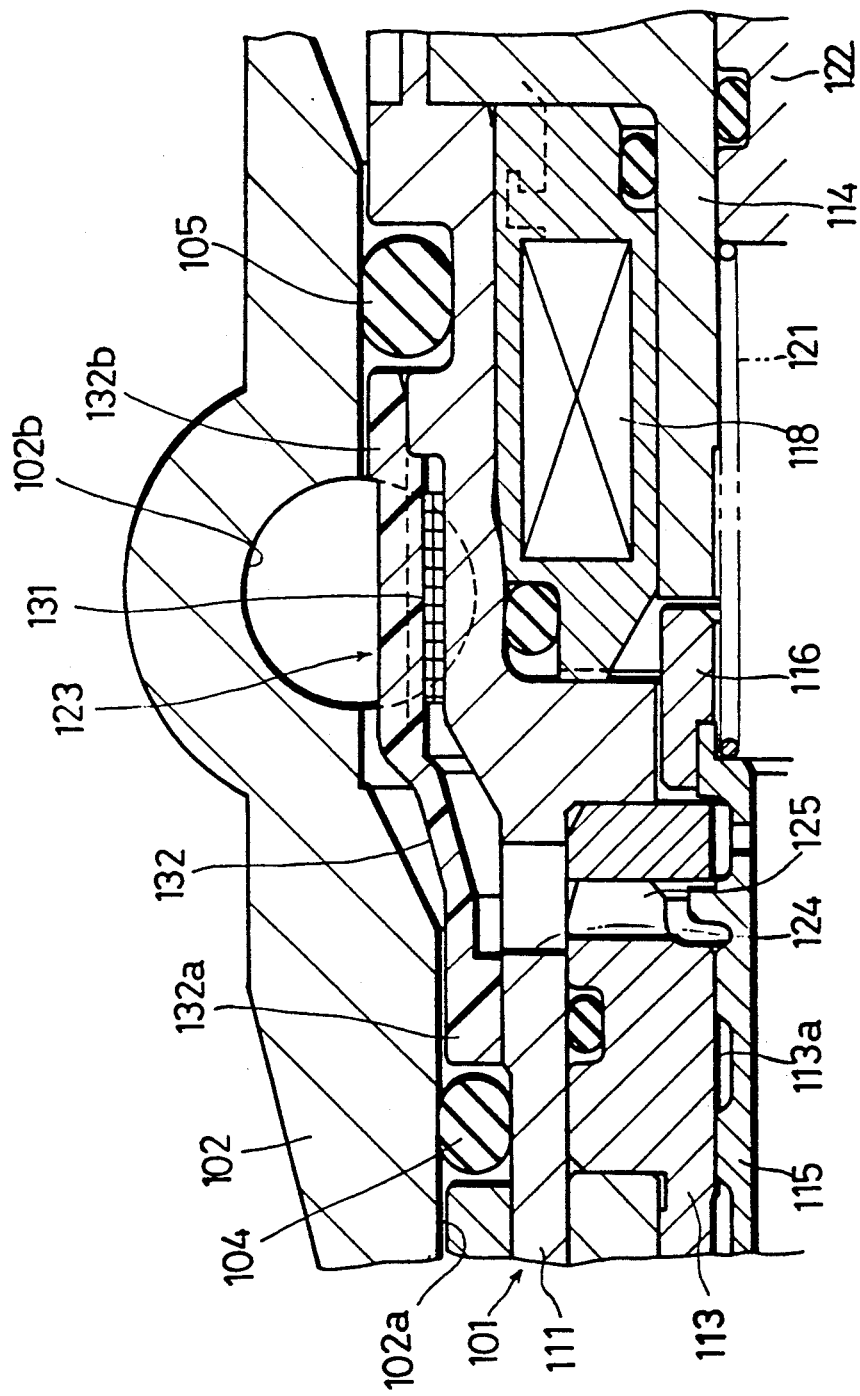
FIG. 5B is an enlarged sectional view of an essential part in FIG. 5A.
Figure 6:
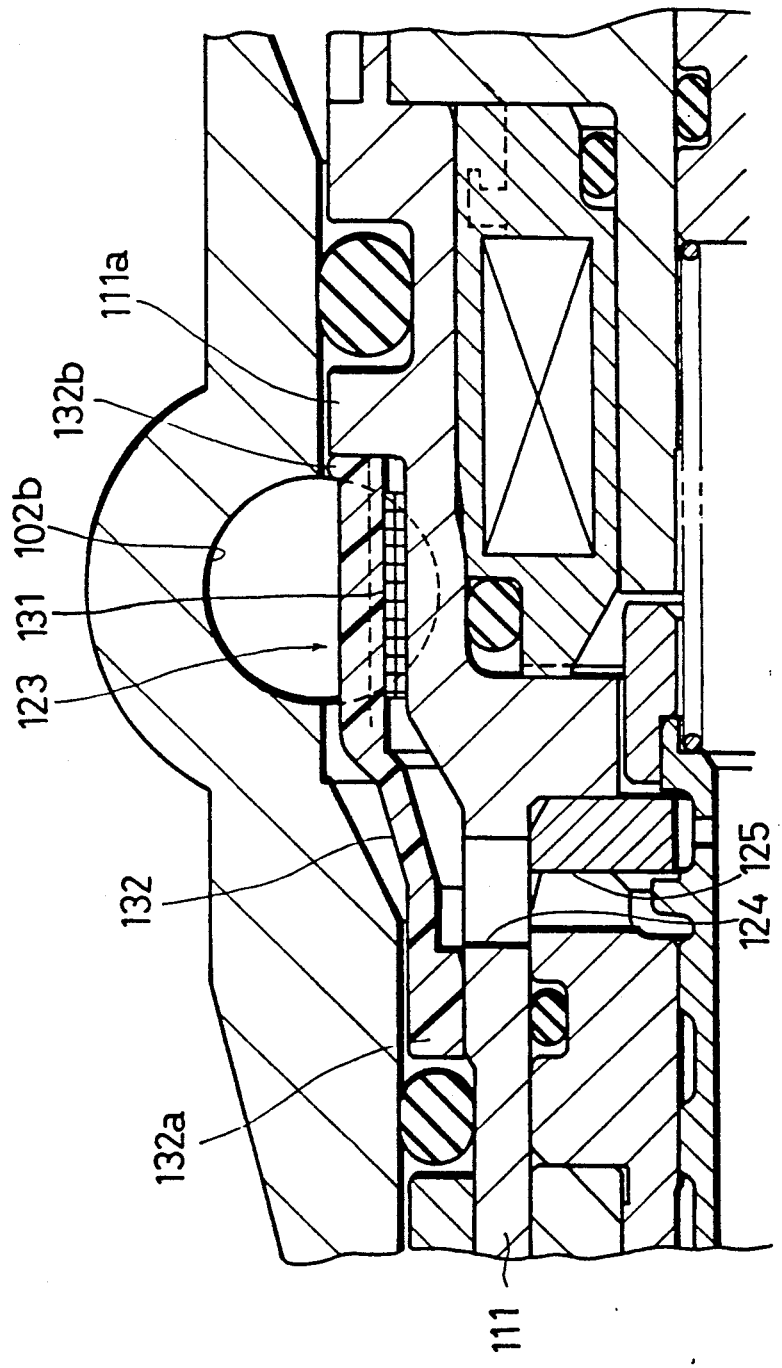
FIG. 6 is a view similar to FIG. 2, showing another example of the prior art.
Figure 7:
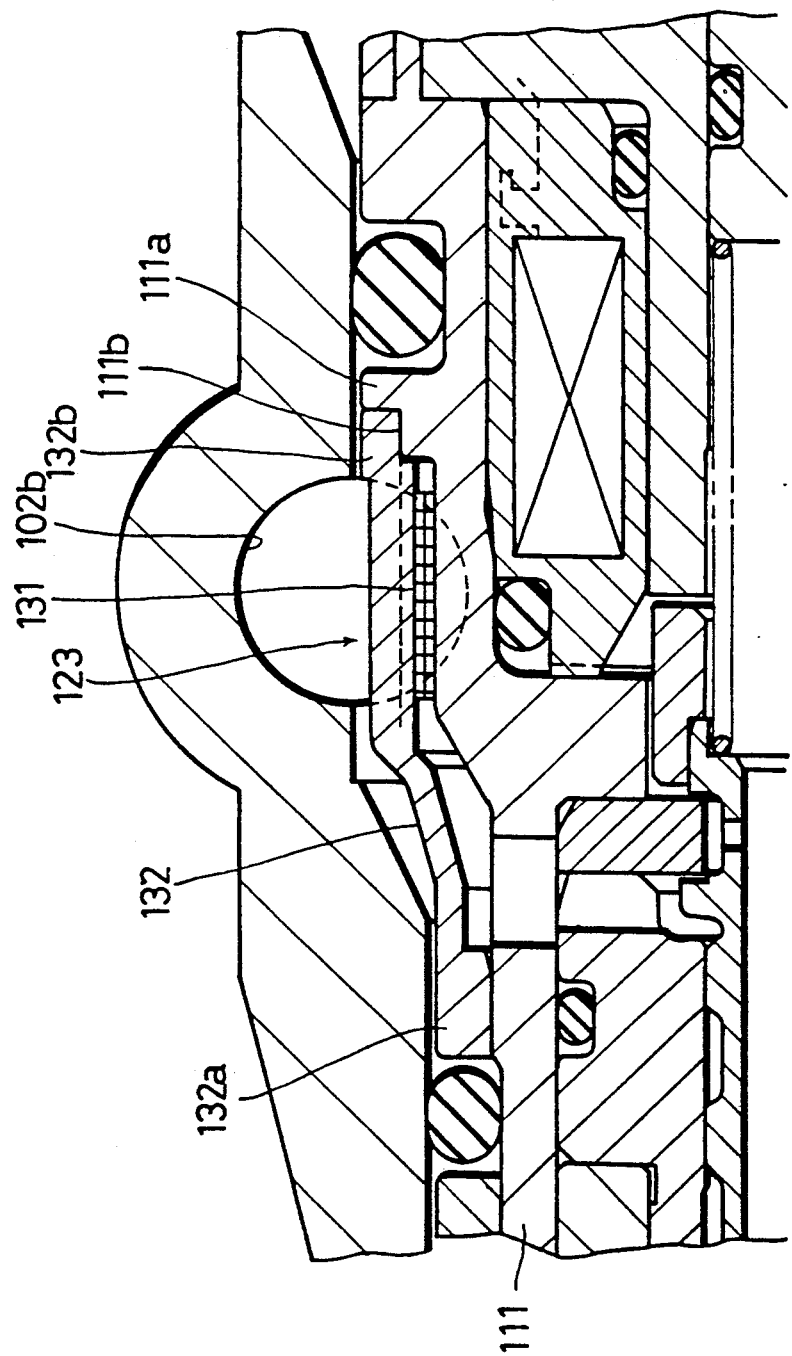
FIG. 7 is a view similar to FIG. 2, showing a further example of the prior art.

Referring to FIG. 4 which shows a third preferred embodiment of the present invention, another metal ring 35 is connected to the rear annular portion 32b of the frame 32 by insert molding of synthetic resin in addition to the construction that the metal ring 33 is connected to the front annular portion 32a by insert molding as mentioned in the first and second preferred embodiments. The metal rings 33 and 35 connected to the frame 32 is press-fitted with the injector casing 11.

Having thus described the preferred embodiments of the invention, it should be understood that numerous structural modifications and adaptations may be made without departing from the spirit of the invention.

What is claimed is:

1. A fuel injector comprising:

an injector casing having a fuel inlet at a side portion thereof;

a valve housing having a fuel injection hole at a front end thereof and having a guide hole at an axial central portion thereof, said guide hole being communicated with said fuel inlet;

a valve reciprocatably accommodated in said guide hole, said valve being adapted to close said fuel injection hole when advancing and open said fuel injection hole when retracting;

means for driving said valve to advance and retract said valve; and a fuel strainer (23) mounted on an outer circumference of said injector casing (11), said strainer comprising a synthetic resin frame (32) having annular portions (32a, 32b) at front and rear ends thereof and a metal ring (33) connected to said front end portion (32a) of said frame (32) by insert molding of synthetic resin, said metal ring (33) being press-fitted with said injector casing (11) to inhibit sliding creep of said frame.

2. The fuel injector as defined in claim 1 further comprising an O-ring (34) interposed between said injector casing (11) and said frame (32), said O-ring being located at said rear end portion of said frame.

3. The fuel injector as defined in claim 1, wherein said metal ring is formed with an annular groove (33a) adapted to be filled with said synthetic resin upon insert molding.

* * * * *